United States Patent [19]

Berch et al.

[11] Patent Number: 5,619,074
[45] Date of Patent: Apr. 8, 1997

[54] ELECTRONIC SECURITY SYSTEM FOR A MOTOR VEHICLE

[75] Inventors: Mark E. Berch, Riverwoods, Ill.; Robert S. Smith, Bonita, Calif.; Harvey Kinzelberg, Glencoe; Charles Bain, N. Dundee, both of Ill.; Frank Sheng, Taichung-Hsieng, Taiwan; George Hanzawa, Tokyo, Japan

[73] Assignee: Sequel Security Systems, Inc., Deerfield, Ill.

[21] Appl. No.: 325,288

[22] PCT Filed: Aug. 18, 1994

[86] PCT No.: PCT/US94/09362

§ 371 Date: Feb. 15, 1995

§ 102(e) Date: Feb. 15, 1995

[87] PCT Pub. No.: WO96/05990

PCT Pub. Date: Feb. 29, 1996

[51] Int. Cl.⁶ ............................ B60R 25/04; H01R 13/26
[52] U.S. Cl. ............................ 307/10.2; 439/621; 307/10.3; 180/287; 340/825.69; 340/426
[58] Field of Search ..................... 439/620, 621, 439/622, 409, 410; 361/833, 837; 307/9.1–10.8; 123/198 B, 198 DB, 198 DC; 180/287; 340/425.5, 426, 428, 430, 825.31, 825.61, 825.66, 825.72; 337/255

[56] References Cited

U.S. PATENT DOCUMENTS

| | | | |
|---|---|---|---|
| 3,328,747 | 6/1967 | Dover | 439/409 |
| 4,333,701 | 6/1982 | Schick | 439/410 |
| 4,556,274 | 12/1985 | Olivera | 439/621 |
| 4,613,192 | 9/1986 | Peterson | 439/621 |
| 4,740,775 | 4/1988 | Price | 180/287 |
| 4,944,697 | 7/1990 | Dorman | 337/255 |
| 4,965,461 | 10/1990 | McRoberts, Jr. | 307/10.8 |
| 5,132,551 | 7/1992 | Carlo | 307/10.3 |
| 5,324,214 | 6/1994 | De Castro | 439/621 |
| 5,419,719 | 5/1995 | Chandler | 439/622 |

*Primary Examiner*—John W. Cabeca
*Assistant Examiner*—Peter Ganjoo
*Attorney, Agent, or Firm*—Dvorak and Traub

[57] ABSTRACT

A security system for automatically disabling an interruptable circuit vital to the operation of a motor vehicle after an ignition of the vehicle is turned off or disabled. The security system includes a base circuit with a relay for disabling the interruptable circuit after the ignition is disabled. The base circuit includes a logic circuit that detects when the ignition is disabled, and for sending a disable signal to the relay. In one embodiment, the base circuit includes a timer circuit for delaying the disable signal to the relay for a specified time period after the ignition is turned off. The disabled interruptable circuit, and the disabled motor vehicle, may be enabled upon actuation of a remote transmitter, or switch on the base circuit. The base circuit also includes adapters for connecting the base circuit to the interruptable circuit and to a power supply of the motor vehicle at a fuse panel of the motor vehicle. In an alternative embodiment, the interruptable circuit and the power supply are coupled to the base circuit by splicing a wire of the interruptable circuit and the power supply circuit, and coupling the spliced wire, with an another adaptor, to the base circuit. The security system also includes an optional vibration detector for detecting motion of the vehicle and a siren circuit for sounding an audible alarm in response to the detection of vibration by the vibration detector.

25 Claims, 8 Drawing Sheets

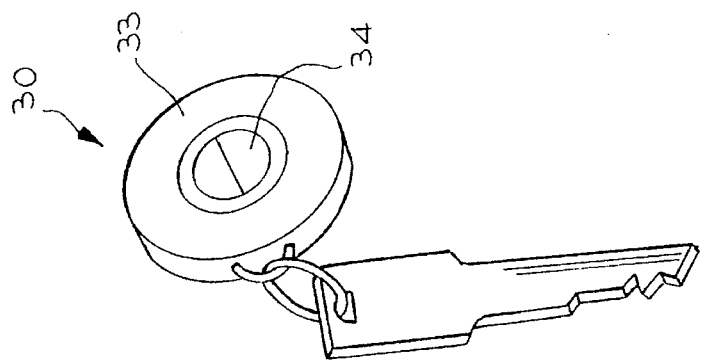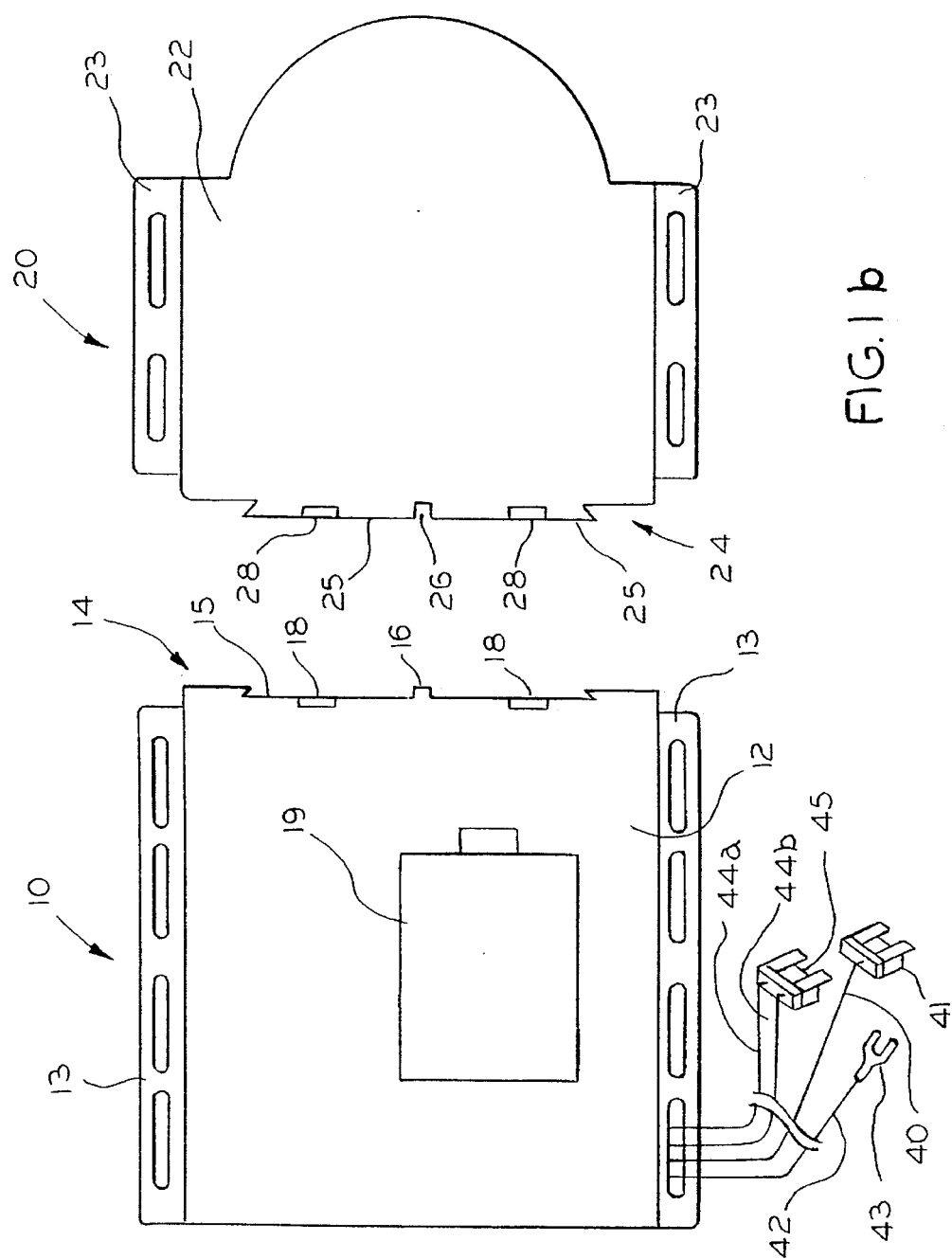

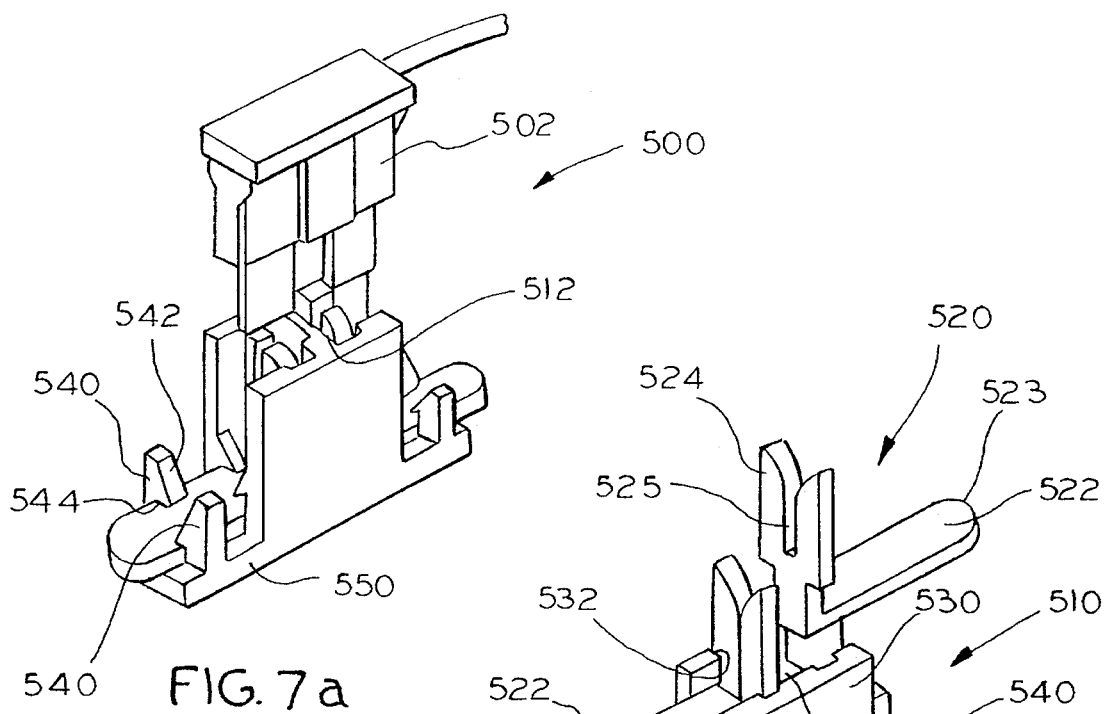
FIG. 7a
FIG. 7b
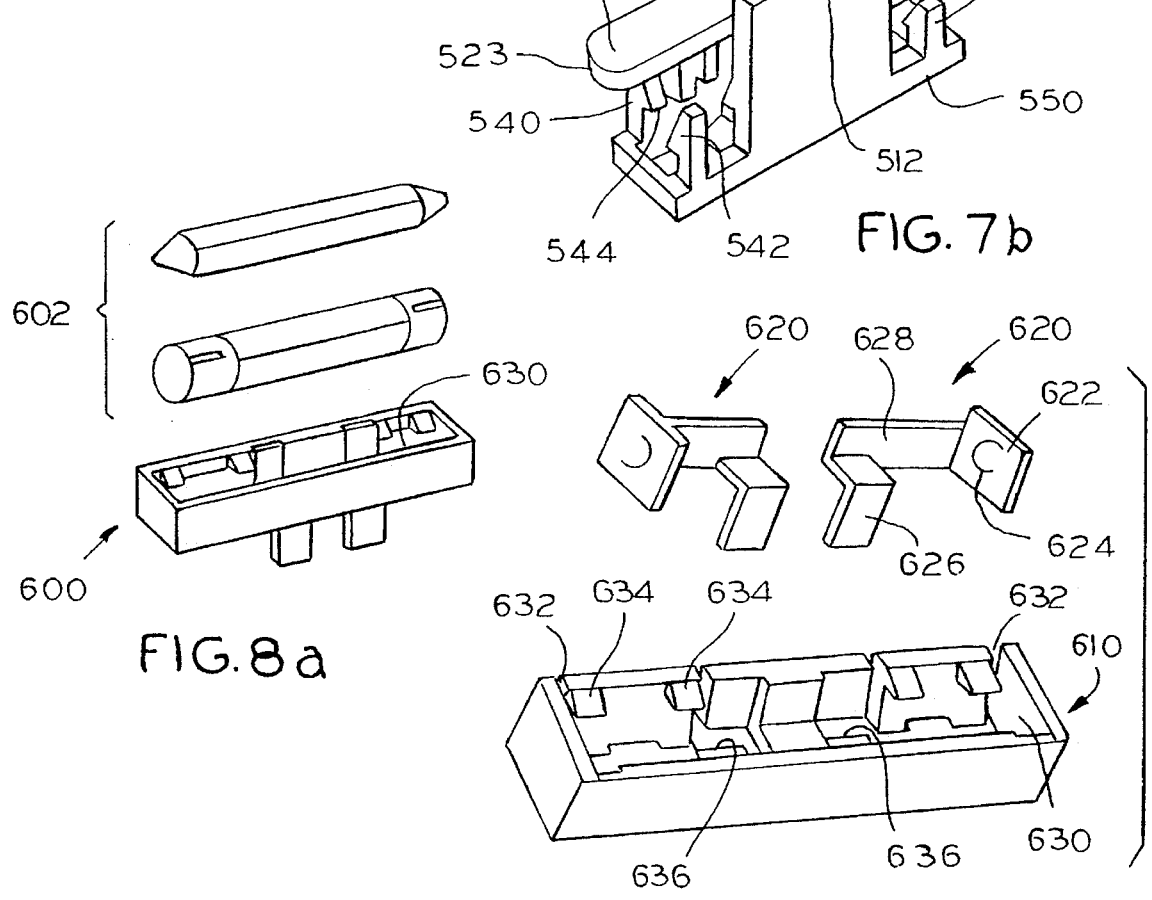
FIG. 8a
FIG. 8b 5,619,074

ELECTRONIC SECURITY SYSTEM FOR A MOTOR VEHICLE

FIELD OF THE INVENTION

The present invention generally relates to a security system for a motor vehicle, and more specifically, to a security system, with an optional vibration detector and alarm, for automatically disabling an interruptable circuit vital to the operation of the motor vehicle after the motor vehicle ignition is turned off or disabled.

BACKGROUND OF THE INVENTION

The marketplace teems with motor vehicle security systems ranging from simple mechanical devices to sophisticated electronically controlled security systems. For example, many automobile manufacturers include a mechanical ignition interlock that prevents the steering wheel from turning until the ignition is enabled with a key. After market mechanical devices include a highly visible bar literally locked to the steering wheel to prevent rotation of the wheel. These mechanical devices, however, are but a slight deterrent to a cunning auto thief, or perpetrator, who, with simple tools, can readily hard wire an ignition interlock, or sever the steering wheel and remove the locked bar. In contrast, electronic based systems are much more difficult to disarm, but at the same time are correspondingly more expensive, particularly the security systems offered as an option by automobile manufacturers. Aftermarket electronic systems, though seemingly less expensive than manufacturer options, require partial disassembly of the motor vehicle, and interfacing the security system with the motor vehicle electrical system. However, most consumers are technically incapable of installing an electronic security system, and are particularly unwilling to cut wires in a motor vehicle electrical system as is often required to install the system. Still other consumers simply do not have the proper tools or time to install a motor vehicle security system, and, therefore, installation of electronic security systems likely must be installed, at substantial expense, by a trained technician. Accordingly, there exists a demonstrated need for an advancement in the art of motor vehicle security systems, and specifically, for an effective electronic based security system that can be readily installed without any special tools or expertise.

It is therefore an object of the present invention to provide a novel method and apparatus for an electronic motor vehicle security system.

It is also an object of the present invention to provide a novel security system for a motor vehicle that automatically disables an interruptable circuit vital to the operation of the motor vehicle after the motor vehicle ignition is turned off or disabled.

It is another object of the present invention to provide a novel security system for a motor vehicle that automatically disables the interruptable circuit vital to the operation of the motor vehicle after the motor vehicle ignition is turned off, wherein the disabled interruptable circuit, and the disabled motor vehicle, may be enabled upon actuation of a remote transmitter or a switch on the security system.

It is another object of the present invention to provide a novel security system for a motor vehicle that delays the automatic disabling of the motor vehicle for a predetermined time period after the motor vehicle ignition is turned off.

It is another object of the present invention to provide a novel security system for a motor vehicle that is economical to manufacture, and readily connectable to the interruptable circuit, and to a power supply circuit of the motor vehicle without any special tools or expertise.

It is still another object of the present invention to provide a novel security system for a motor vehicle that is connectable to the interruptable circuit and the power supply circuit by merely coupling the security system to a fuse panel of the motor vehicle.

It is another object of the present invention to provide an adaptor for readily coupling the security system to the interruptable circuit and power supply circuit at the fuse panel of the motor vehicle.

It a further object of the present invention to provide a novel security system for a motor vehicle that is connectable to the interruptable circuit and the power supply of the motor vehicle by coupling the security system to a wire of the respective interruptable circuit and power supply circuit.

It is a further object of the present invention to provide an adaptor for readily coupling the security system to the interruptable circuit and the power supply circuit of the motor vehicle by merely crimping the adaptor over the wire, without cutting the wire into separate portions and then connecting the separate portions to the motor vehicle electrical system.

It is still a further object of the present invention to provide a novel security system for a motor vehicle that includes an optional vibration detector circuit that enables an audible siren, or other deterring alarm, upon detecting vibration of the motor vehicle.

Accordingly, the present invention is directed toward a novel security system for automatically disabling an interruptable circuit of a motor vehicle after an ignition of the motor vehicle is turned off or disabled. The system includes a base circuit with a relay for disabling the interruptable circuit after the ignition is disabled. The base circuit also includes a logic circuit coupled to the interruptable circuit for detecting when the ignition is disabled, and for sending a disable signal to the relay. In one embodiment, the base circuit includes a timer circuit coupled to the logic circuit for delaying the disable signal to the relay for a specified time period after the ignition is turned off. The disabled interruptable circuit, and the disabled motor vehicle, may be enabled upon actuation of a remote transmitter, or a switch on the base circuit. The base circuit is powered by a power supply circuit of the motor vehicle that has power when the ignition of the motor vehicle is off. In one embodiment, a dummy fuse, without a fuse element, having spade type contacts, and leads coupled to the base circuit, is plugged into a fuse socket of the motor vehicle to couple to the interruptable circuit to the base circuit. A power fuse having spade type contacts, and a power conductor coupled to one of the fuse contacts, is plugged into another fuse socket of the motor vehicle to couple the motor vehicle power supply circuit to the base circuit. The security system may include a spade type contact adaptor for coupling the spade type contacts of the dummy fuse and the power fuse of the base circuit to a glass or ceramic type fuse socket of the motor vehicle. The security system may also include a glass or ceramic type fuse adaptor for coupling a glass or ceramic type fuse removed from the glass or ceramic fuse panel of the motor vehicle to a spade type fuse socket of the base circuit. In an alternative embodiment, the interruptable circuit and the power supply are coupled to the base circuit by splicing a wire of the interruptable circuit and a wire of the power supply circuit, and coupling the spliced wires, with a wire splicing spade type contact adaptor, to the base circuit. In one embodiment, the remote control is an RF signal transmitter, and the base circuit includes a receiver circuit for receiving the RF signal from the remote transmitter. The base circuit includes a filter circuit coupled to the receiver circuit for selecting specified RF frequency signals received by the receiver circuit and eliminating undesired frequencies. The base circuit also includes an amplifier circuit coupled to the filter circuit, to amplify the filtered signal. A decoder circuit is coupled to the amplifier circuit, and decodes the amplified RF signal. The decoder is also coupled to the logic circuit, and sends an enable signal to the logic circuit for enabling the disabled interruptable circuit. The security system includes an optional vibration detector and siren circuit for detecting motion of the vehicle and sounding an audible alarm in response to detecting vibration of the motor vehicle. The vibration and siren circuit is electrically coupled to the base circuit, which provides power and electrical ground to the vibration detection and siren circuit, when the interruptable circuit is disabled.

These and other objects, features and advantages of the present invention will become apparent upon consideration of the following Detailed Description of the Invention with the accompanying drawings.

BRIEF DESCRIPTION OF THE DRAWINGS

FIG. 1a is a plan view of a security module for an electronic security system mountable in a motor vehicle.

FIG. 1b is a plan view of a speaker module for a vibration sensor and a siren mountable in a motor vehicle, which is mechanically and electrically connectable to the security module of FIG. 1a.

FIG. 1c is a perspective view of a remote transmitter module for sending a signal to the security system module of FIG. 1a.

FIG. 2a is an electronic circuit block diagram of a base circuit housed in the security module of FIG 1a.

FIGS. 3a and 3b are an electronic circuit schematic of the base circuit block diagram of FIG. 2a.

FIG. 6b is a partial perspective view of the hinged fuse adaptor of FIG. 6a.

FIG. 7a is a perspective view of a spade type fuse adaptor for coupling spade type contacts to a glass tube or ceramic type fuse socket.

FIG. 7b is an exploded perspective view of the spade type contact adaptor of FIG. 7a.

FIG. 8a is a perspective view of a glass or ceramic type fuse adaptor for coupling a glass or ceramic type fuse to a spade type contact socket.

FIG. 8b is an exploded perspective view of the glass or ceramic type fuse adaptor of FIG. 8a.

DETAILED DESCRIPTION OF THE INVENTION

Figure 2B:
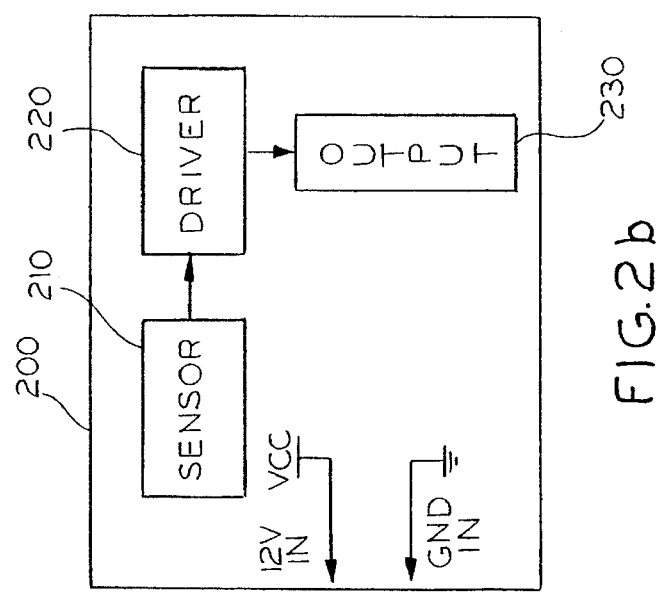
FIG. 2b is an electronic circuit block diagram of a speaker and vibration sensing circuit housed in the speaker module of FIG. 1b.

The present invention is an electronic security system for automatically disabling a motor vehicle after the motor vehicle ignition has been turned off or disabled. The disabled motor vehicle is enabled by a remote transmitter. The security system generally comprises a security module 10, an optional speaker and vibration sensor module 20, and a remote transmitter module 30 as illustrated in FIG. 1. The security module 10 is mountable on a motor vehicle not shown in the drawing, preferably in an inconspicuous location, for example, under a dash-board, in a locked engine compartment, or in some other location hidden from the view of a casual observer. The optional speaker module 20 is also mountable on the motor vehicle, and is mechanically and electrically connectable to the security module 10. The remote transmitter module 30 is a pocket size unit designed to be carried on the person of an authorized user, and may be fashioned as a component of a key ring.

FIG. 1a is a plan view of the security module 10, comprising a housing 12 for receiving a base circuit discussed below, and having one or more mounting flanges 13 for mounting the module 10 on the motor vehicle. The security module 10 includes an interface 14 having a dove tail slot, or mortise, 15 with a protruding alignment key 16 for engaging the optional speaker module 20. Electrical contacts 18 mounted on the interface 14 are electrically coupled to the base circuit, and are electrically connectable to the optional speaker module 20. A plate, not shown in the drawing, having a complimentary shaped dove tail flange, or tenon, with an alignment groove may be slidably engaged in the dove tail slot 15 of the security module 10. The plate covers and protects the electrical contacts 18 in the event that an optional speaker module 20 is not connected to the security module 10. The security module 10 includes a removable cover 19 to provide ready access to one or more fuse sockets on the base circuit not shown in the drawing. In one embodiment, the fuse sockets are spade type contact sockets for receiving a spade type fuse known in the art. A first single color-coded electrical lead or power conductor 40, electrically coupled to a 12 $V_{in}$ connector of the base circuit discussed below, extends from the security module 10, and is electrically coupled to a spade type fuse 41 having a fuse element to provide electrical power to the base circuit. A second, single color-coded lead or ground conductor 42, electrically coupled to a $GND_{in}$ connector of the base circuit discussed below, extends from the security module 10, and is electrically coupled to a contact 43 which is connectable to the motor vehicle chassis, or other common ground, to provide an electrical ground to the base circuit. A pair of color-coded electrical leads 44a and 44b also extend from the security module 10, and at one end are electrically coupled to a dummy spade type fuse 45. The leads 44a and 44b are electrically isolated at the dummy fuse 45 due to the lack of a fuse element therein. The leads 44a and 44b are also electrically connected to an $IC_{in}$ connector and an $IC_{out}$ connector of the base circuit 100, respectively, as further discussed below. The dummy fuse 45 and the leads 44a and 44b couple an electrical circuit, vital to the operation of the motor vehicle, and hereinafter referred to as an "interruptable circuit", to a relay R1 in the base circuit. The base circuit automatically disables the interruptable circuit, and the motor vehicle, after the motor vehicle ignition is turned off as discussed below.

FIG. 1b is a plan view of the speaker module 20, comprising a housing 22 for receiving a speaker and vibration sensing circuit discussed below, and having one or more mounting flanges 23 for mounting the speaker module 20 on the motor vehicle. The speaker module 20 includes an interface 24 having a dove tail flange, or tenon, 25 with an alignment groove 26 that engages the interface 14 of the security module 10. The tenon 25 mates with the mortise 15 by aligning the key 16 with the slot 26 and sliding the tenon 25 in the mortise 15 to engage and securely couple the security module 10 and the speaker module 20. Electrical contacts 28 of the speaker module 20 frictionally engage, and are electrically coupled to, the contacts 18 of the security module 10. The electrical and mechanical coupling between the modules 10 and 20 is further secured by fastening the mounting flanges 13 and 23 of the modules on the motor vehicle. The modules may be secured to the motor vehicle with screws extending through the mounting flanges 13 and 23, and by an adhesive or an adhesive tape that securely bonds the modules to the vehicle. In an alternative embodiment, the speaker module 20 is located apart from the security module 10 in a location that optimizes emission of sound from a speaker, and optimizes sensitivity of the vibration detecting circuit discussed below. In this alternative embodiment, the speaker module 20 is not mechanically coupled to the security module 10, but is electrically coupled to the security module 10 by auxiliary electrical connectors, not shown in the drawing, that electrically couple the contacts 18 and 28.

FIG. 1c is a perspective view of the remote transmitter module 30, comprising a pocket size housing 33 that encloses a transmitter circuit that transmits a signal to the base circuit for enabling a disabled interruptable circuit and motor vehicle as discussed below. The module 30 includes a switch actuator 34 accessibly mounted on the transmitter module 30 for actuating a switch SW2 on the transmitter circuit. In another embodiment, the remote transmitter module 30 may be discretely mounted on the motor vehicle in a location where the switch actuator 34, or switch SW2, is readily accessible to an authorized user.

The modules 10, 20 and 30 are comprised of a highly durable, shock resistant and resilient material, for example a molded plastic, that encloses and protects the contents disposed therein from the moisture, sunlight and detrimental vibrations imparted to the modules by the motor vehicle, or by the mere handling of the modules. In one embodiment, the modules are comprised of a sealed unitary housing with a removable lid, or cover, to provide access to the contents thereof, for example, to insert and replace fuses in the base module 10, or to insert and replace batteries in the remote module 30. In an alternative embodiment, the modules are comprised of a sealed housing having several components that may be disassembled to provide access to the contents thereof. The removable cover and components of the housings may include a sealable gasket, or other means known in the art, to protect the contents of the modules as discussed above.

Figure 2C:
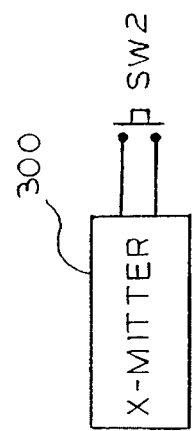
FIG. 2c is an electronic circuit block diagram of a remote transmitter circuit housed in the remote transmitter module of FIG. 1c.
Figure 2A:
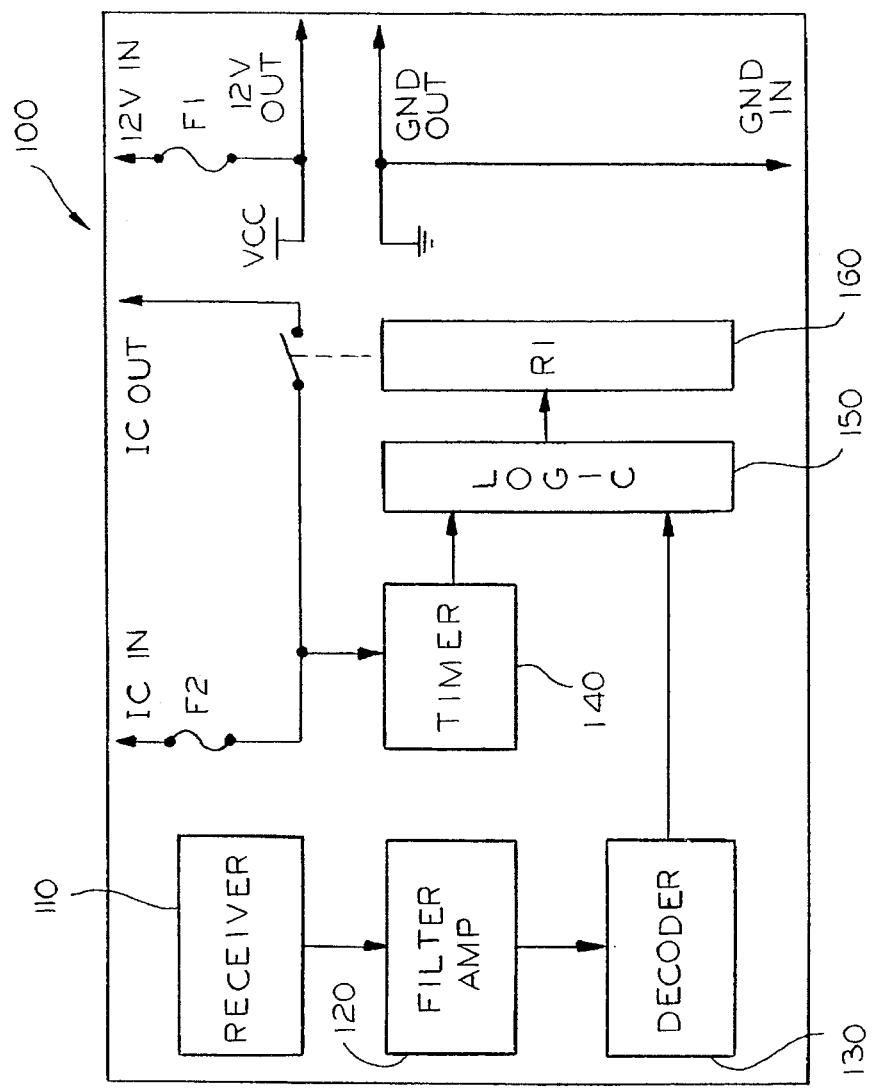

FIG. 2a is block diagram of a base circuit 100 housed in the security module 10 generally comprising an RF receiver circuit 110, a filter and amplifier circuit 120, a decoder circuit 130, a timer circuit 140, a logic circuit 150, and a relay circuit 160, wherein the base circuit 100 automatically disables an interruptable circuit vital to the operation of the motor vehicle after the motor vehicle ignition is turned off. FIG. 2b is a block diagram of the optional speaker circuit 200 housed in the speaker module 20 generally comprising a vibration sensor or detector circuit 210, and a driver circuit 220 for driving an output circuit 230, wherein the speaker circuit 200 activates an audible or visual alarm upon detection of vibrations of the motor vehicle above some threshold vibration level. FIG. 2c is a block diagram of the transmitter circuit 300 housed in the remote transmitter module 30, wherein the transmitter circuit 300 transmits a signal to the base circuit 100 to enable the disabled interruptable circuit, which enables the disabled motor vehicle. The base circuit 100 is powered by 12 volts drawn from a 12 volt circuit of the motor vehicle, which has power when the motor vehicle ignition is off. Generally, a fuse from the 12 volt circuit is removed from the fuse panel of the motor vehicle, and is replaced by the fuse 41 with the power conductor 40 connected to the 12 $V_{in}$ connector of the base circuit 100. In one embodiment, the fuse 41 is plugged into a fuse socket of an emergency flasher or brake light circuit, and has a rating that is generally greater than the fuse removed from the circuit, for example, a 30 ampere fuse. As discussed above, the base circuit 100 includes a fuse socket for receiving a fuse F1 to protect the circuit on the motor vehicle that provides the 12 volt supply to the base circuit 100. Generally, the fuse removed from the fuse panel is simply plugged into the fuse socket of the base circuit 100. In an alternative embodiment, 12 volts is drawn from any known 12 volt circuit on the motor vehicle, assuming it has power when the ignition is off, by splicing a wire in the circuit, and connecting the lead 40 to the spliced wire. If the 12 volt supply is obtained by splicing a 12 volt supply line on the motor vehicle, an auxiliary fuse F1 must be plugged into the fuse socket of the base circuit 100. As discussed above, the base circuit 100 is electrically grounded to the chassis, or other appropriate electrical ground, on the motor vehicle by the lead 42 coupled to the $GND_{in}$ connector of the base circuit 100. The base circuit 100 also includes a 12 $V_{out}$ connector and a $GND_{out}$ connector coupled to a respective electrical contact 18 of the security module 10 for providing 12 volt power and electrical ground from the base circuit 100 to the speaker and siren circuit 200, which includes a corresponding 12 $V_{in}$ connector and a $GND_{in}$ connector coupled to a respective electrical contact 28 of the speaker module 20.

As discussed above, the interruptable circuit may be any circuit that is vital to the operation of the motor vehicle. In one embodiment, the interruptable circuit is a motor vehicle fuel pump circuit, which is automatically disabled by the relay R1 of the relay circuit 160 of the base circuit 100 after the motor vehicle ignition is disabled. The fuel pump circuit is coupled to the base circuit 100 by replacing a fuel pump fuse in the fuse panel with the dummy fuse 45 and the pair of electrical leads 44a and 44b connected to respective connectors $IC_{in}$ and $IC_{out}$ of the base circuit 100. The base circuit 100 may also include a fuse socket for receiving a fuse F2 corresponding to the fuse removed from the fuse panel to protect the interruptable circuit, in the present example, the fuel pump fuse. In a similar manner, the base circuit 100 may be used to control any other interruptable circuit vital to the operation of the vehicle, which is accessible by replacing a fuse of the interruptable circuit at the fuse panel with the dummy fuse 45 coupling the interruptable circuit to the connectors $IC_{in}$ and $IC_{out}$ of the base circuit 100. In an alternative embodiment, the interruptable circuit is the motor vehicle ignition system, or some other electrical system circuit, which is not accessible at the fuse panel. In this embodiment, a wire in the interruptable circuit is spliced, for example, at a point along the steering column, and the spliced wires are coupled to respective connectors $IC_{in}$ and $IC_{out}$ of the base circuit 100 via the leads 44a and 44b. In one embodiment, the dummy fuse 45 is coupled to the spliced wires by an adaptor that splices the wire when the adaptor is crimped to the wire. Accordingly, the base circuit 100 may readily be coupled to any interruptable circuit vital to the operation of the motor vehicle, wherein the relay R1 of the base circuit 100 automatically disables the motor vehicle by disabling the interruptable circuit after the ignition of the motor vehicle is turned off. In one embodiment, the base circuit 100 includes a switch SW1 for manually enabling the disabled interruptable circuit, wherein the switch SW1 is readily accessible to an authorized user.

Figure 3A:
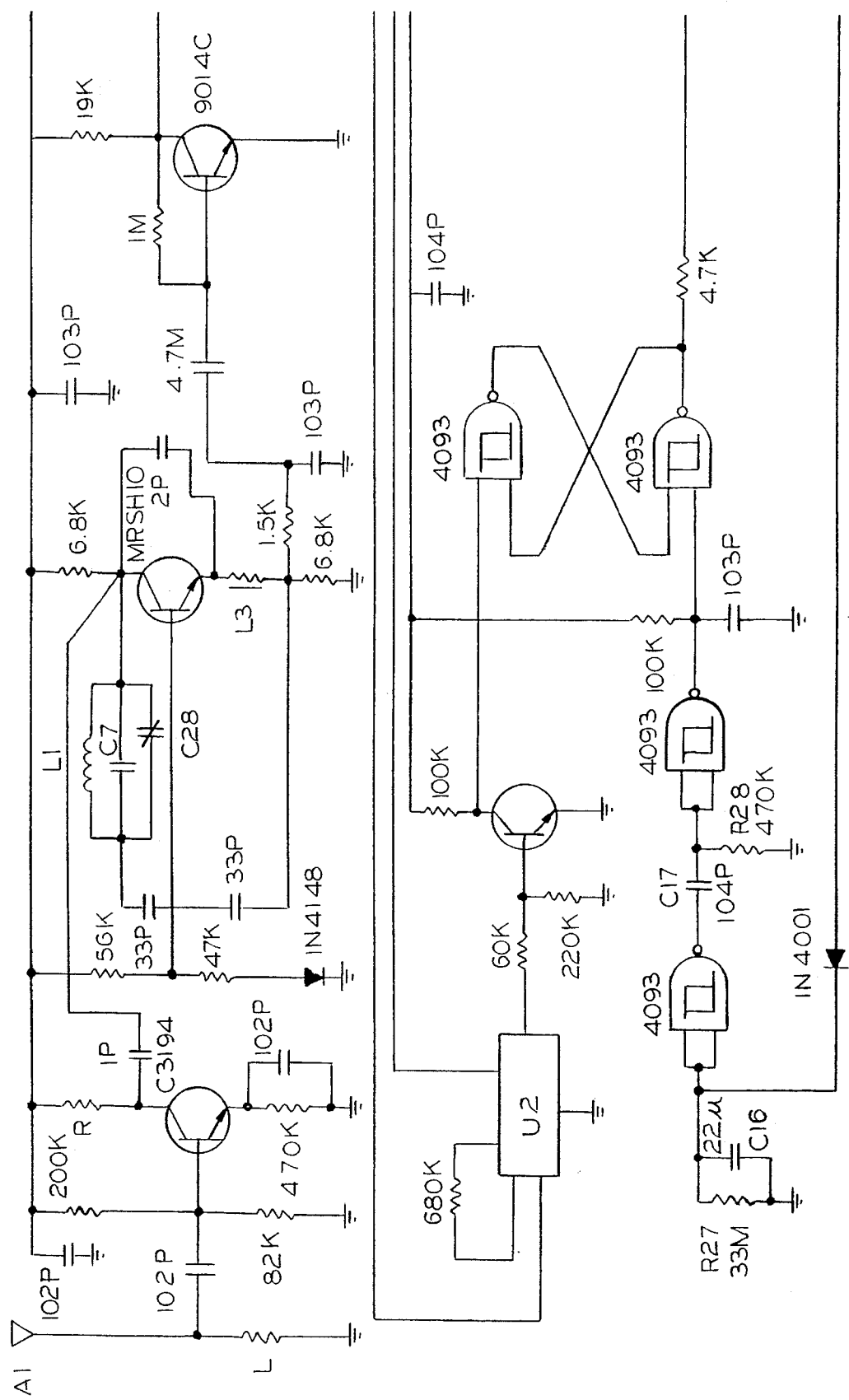
Figure 3B:
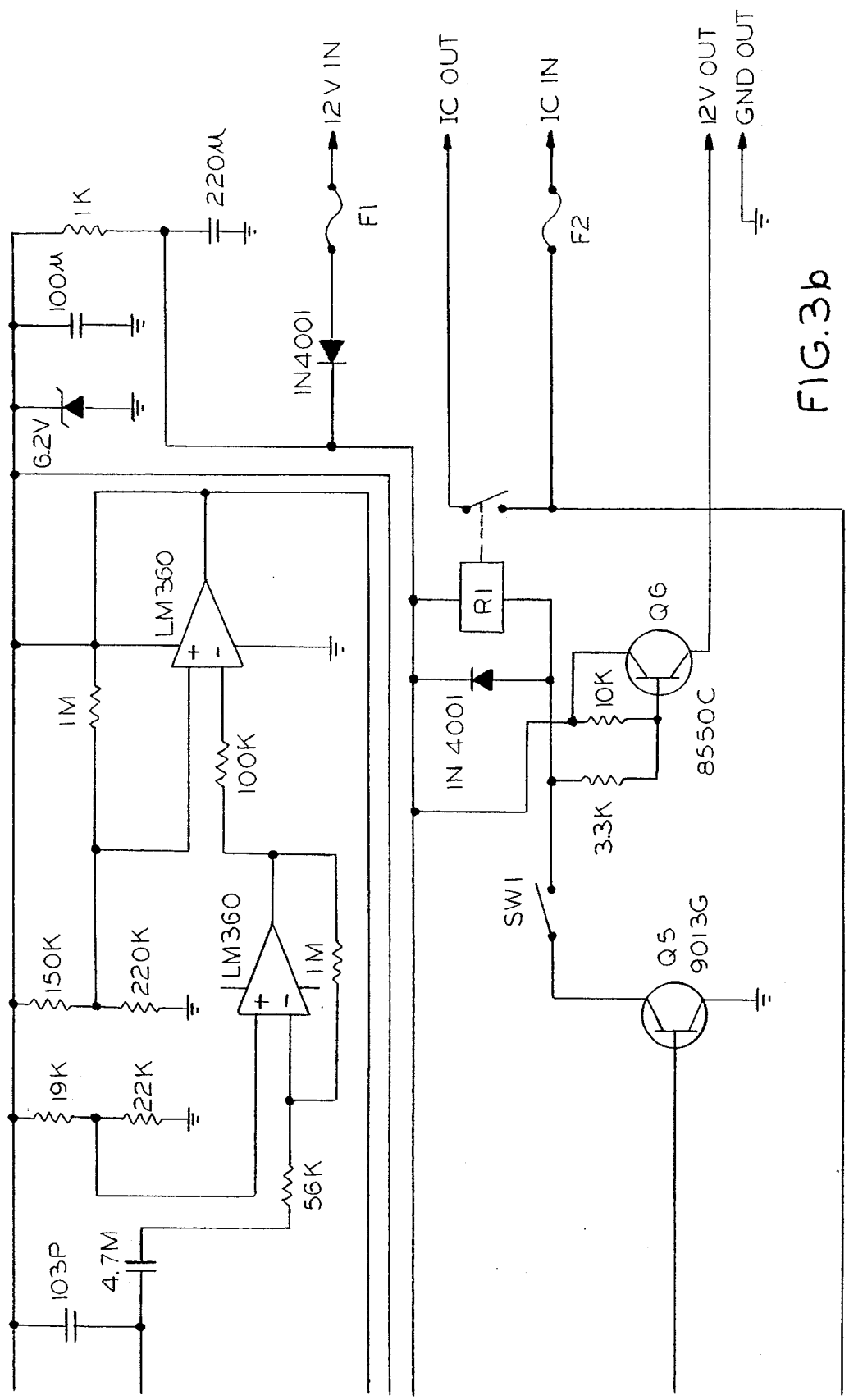

FIGS. 3a and 3b comprise an exemplary electronic circuit schematic of the base circuit block diagram of FIG. 2a. The logic circuit 150 of the base circuit 100 is coupled to the interruptable circuit for detecting when the motor vehicle ignition has been turned off. The logic circuit then sends a disable signal to the relay R1 to disable the interruptable circuit. In one embodiment, the timer 140 circuit delays the disable signal to the relay circuit 160 for a specified time period after the ignition has been turned off, wherein the relay R1 disables the interruptable circuit after the delay time period. In one embodiment, the timer circuit 140 delay time period is two minutes, but other delay time periods having longer or shorter delay times may also be used. In the exemplary circuit, the delay time period is controlled by selection of an RC time constant determined by C16, C15, R27 and R28. If the motor vehicle ignition is turned back on before the specified delay time period, the logic circuit 150 will not send the disable signal to the relay circuit 160, and the interruptable circuit and the motor vehicle will not be disabled. In the exemplary embodiment, logic circuit 150 controls a transistor Q5 which in turn control the relay R1. In one embodiment, the transistor Q5 also controls a transistor Q6 which functions as a switch to control the 12 volt power to the speaker circuit 200 via the 12 $V_{out}$ connector of the base circuit. Transistor Q6 enables the power to the speaker circuit 200 when the logic circuit 150 sends a disable signal to the transistor Q5 of relay circuit 160 for disabling the interruptable circuit. Accordingly, the vibration detector circuit 210 and the output circuit 230 are powered only when the motor vehicle is disabled.

The relay R1 enables the disabled interruptable circuit, and the disabled motor vehicle, when the base circuit 100 receives an appropriate enable signal from the remote transmitter circuit 300. Accordingly, the receiving circuit 110 includes an antenna A1 for receiving a signal in the frequency range transmitted by the transmitter circuit 300. In one embodiment, the signal is an RF signal in the 300 MHz range, and the receiver circuit 110 includes an oscillator comprising L1, C7 and C28 which is tuned to receive signals in a frequency range emitted by the transmitter circuit 300. The signal received by the receiver circuit 110 is filtered by the filter and amplifier circuit 120, wherein frequency selection is performed by L3, and undesired frequencies are grounded by C9. The selected signal is then amplified by transistor Q3. The amplified signal is input to the decoder circuit 130, and in one embodiment, the decoder circuit includes an operational amplifier which converts the generally sinusoidal input signal into a square wave, and subsequently inverts the square wave signal with an inverter. The inverted signal is coupled to a decoder U2 which provides a decoded enable signal to the logic circuit 150, which in turn controls transistor Q5 to switch the relay R1 to enable the disabled interruptable circuit coupled to the connectors $IC_{in}$ and $IC_{out}$. At the same time, the transistor Q5 switches transistor Q6 to disable the 12 volt supply to the speaker circuit 200. In another embodiment, the base circuit 100 includes a by-pass switch SW1 for manually enabling the interruptable circuit, and for disabling the power to the speaker circuit 200. The switch SW1 may be accessibly disposed within the security module 10, or accessibly mounted on the motor vehicle external to the security module 10.

Figure 4:
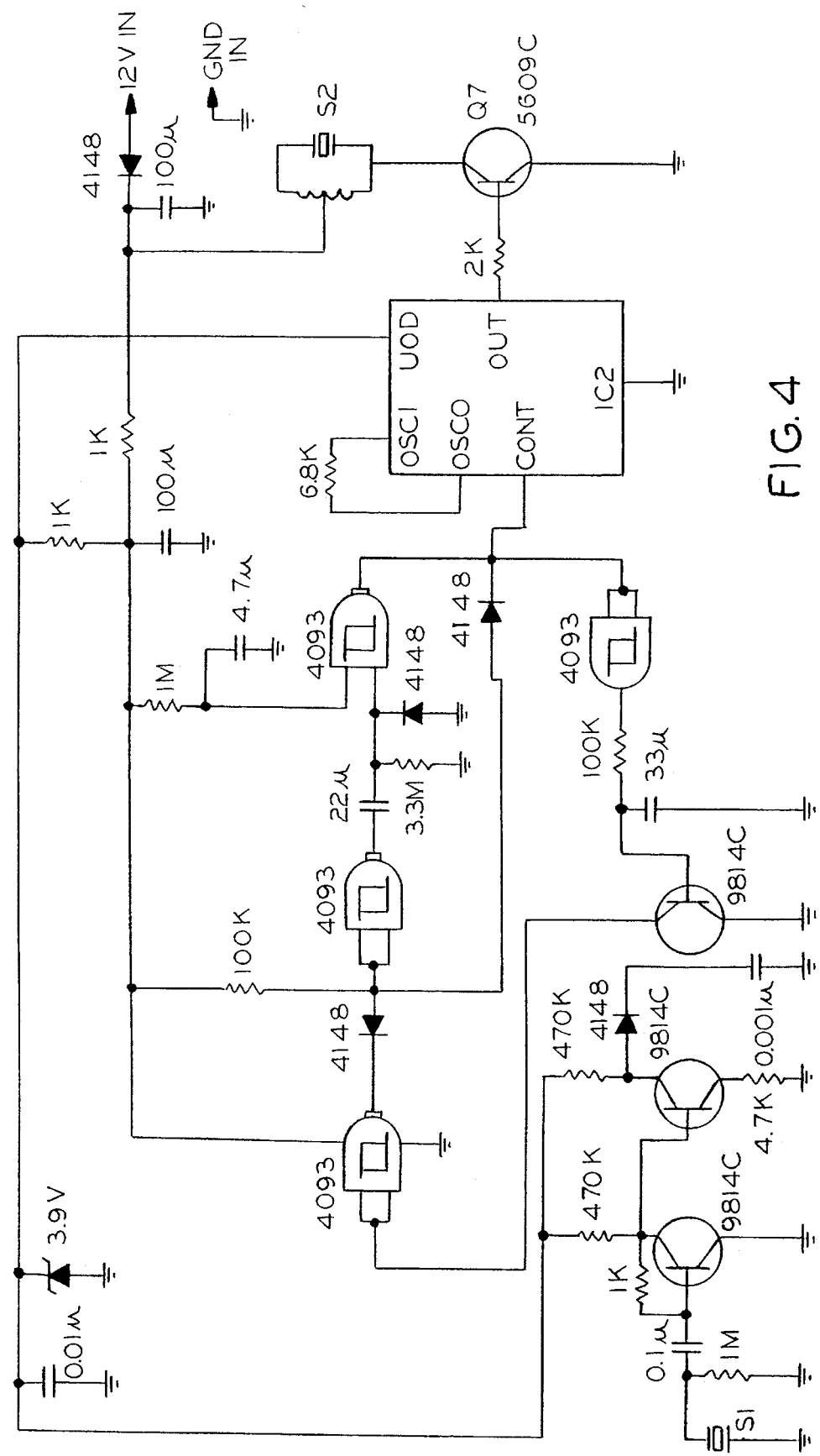
FIG. 4 is an electronic circuit schematic of the speaker and vibration sensing circuit block diagram of FIG. 2b.

FIG. 4 is an exemplary electronic circuit schematic of a speaker circuit 200 of the speaker circuit block diagram of FIG. 2b. The vibration detection circuit 210 includes a motion, or vibration, detector S1, for example, a piezo-electric transducer, for detecting vibration of the motor vehicle which may be caused by breaking glass or any movement of the vehicle above some threshold. Upon detection of a vibration, the detection circuit 210 enables a sound generating device IC2, which drives a transistor Q7 of the driver circuit 220 which actuates a siren S2, for example, a piezo-electric transducer, of the output circuit 230 for emitting an audible alarm at 100 to 120 decibels to frighten and dissuade perpetrators. In one embodiment, the alarm sounds for a predetermined period of time and then turns off, or resets, until it is again actuated by the driver circuit in response to the detection of another vibration. The vibration detection circuit 210 is disabled when the siren S2 is enabled. The driver circuit 220 may also actuate other types of output circuits 230 for indicating that the motor vehicle is under assault by a perpetrator. In one embodiment, the driver circuit 220 actuates a strobe light, visible from within the motor vehicle, alone or in combination with the siren S2. As discussed above, the base circuit 100 does not provide power to the speaker circuit 200 unless the interruptable circuit is disabled. Accordingly, the speaker circuit 200, like the base circuit 100, is disabled any time the motor vehicle ignition is on, thereby preventing the vibration detection circuit 210 from enabling the driver circuit 220 and providing power to the output circuit 200. Further, the timer circuit 140 delays the supply of 12 volt power to the speaker circuit 200 for the same specified time period that the relay R1 actuation signal is delayed after the motor vehicle ignition is turned off.

Figure 5:
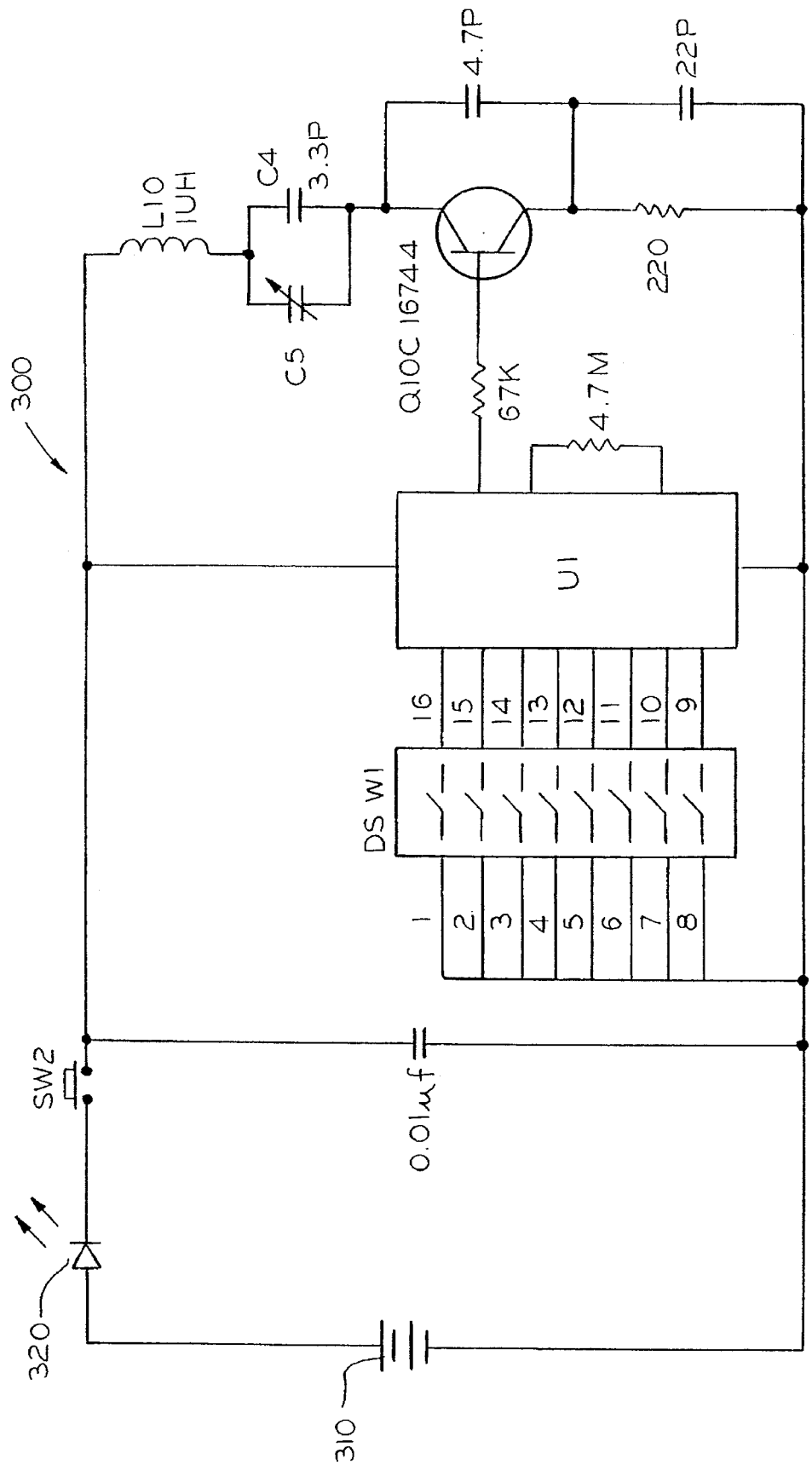
FIG. 5 is an electronic circuit schematic of the remote transmitter circuit block diagram of FIG. 2c.

FIG. 5 is an exemplary circuit schematic of the remote transmitter circuit 300. The circuit 300 generally comprises an RF oscillator circuit comprising L10, C4 and C5 coupled to the collector of a transistor Q10. The transmitter frequency is in the 300 MHz range in compliance with the United States Federal Communications Commission (FCC) Regulations for remote control devices. The actual frequency of the transmitter is determined by setting Dip switches DSW1 which are connected to input line of a encoder U1, wherein selecting different switch combinations selects, or tunes, the transmitter frequency in the appropriate frequency range. Other frequency ranges may also be used where necessary to comply with regulations imposed by governing bodies of foreign countries. A battery 310 provides a voltage to the transmitter circuit 300. When the switch SW2 of the remote transmitter is closed, an RF signal is transmitted by the remote transmitter circuit 300 and received by the receiver circuit 110 of the base circuit 100, which enables the disabled interruptable circuit. An LED 320 may be included in the transmitter circuit 300 to indicate that the switch SW2 is closed, and that a signal is being transmitted by the circuit 300. The remote transmitter circuit 300 has an effective range of at least approximately 8 to 10 feet when configured for remote control operation. In another embodiment, the transmitter circuit 300 may be discretely mounted on the motor vehicle as suggested above.

Figure 6A:
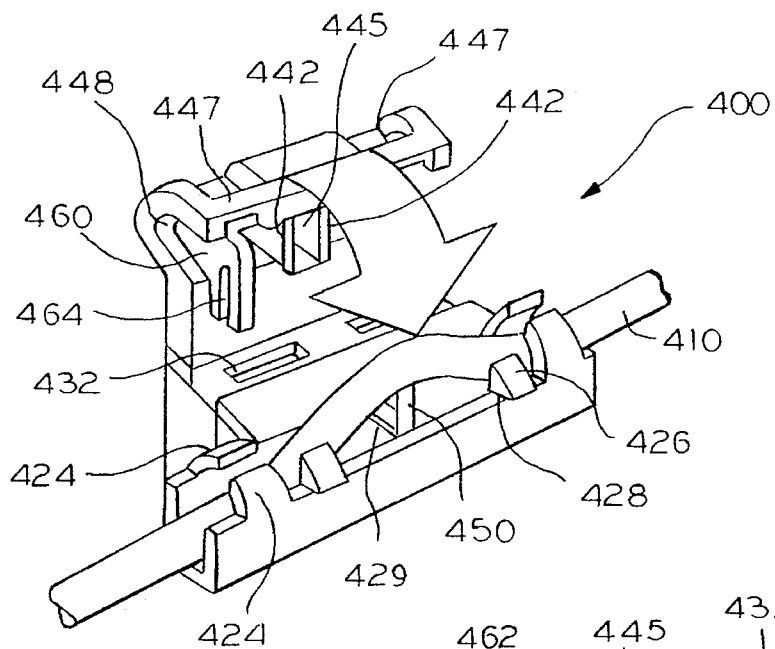
FIG. 6a is a perspective view of a hinged spade type contact adaptor for splicing a wire, and coupling the spliced wire to spade type contacts.
Figure 6B:
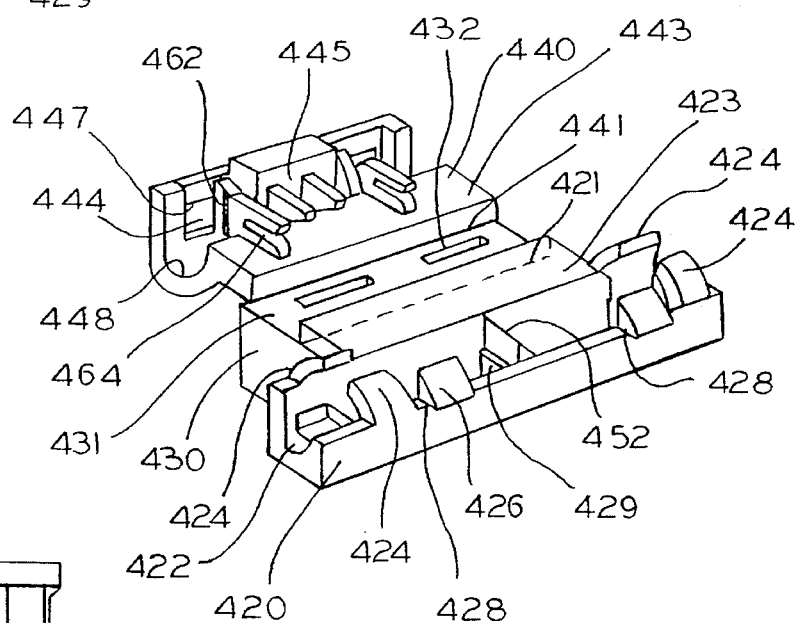

FIGS. 6a and 6b are perspective views of a hinged spade type fuse adaptor 400 for splicing a wire 410, and, as applied in the present invention, for splicing an interruptable circuit or a 12 volt power supply line of a motor vehicle as discussed above. In one embodiment, the hinged fuse adaptor 400 is a unitary resilient plastic member having a wire housing 420, a fuse housing 430 with spade type fuse contact sockets 432, and an electrical contact housing 440. The wire housing 420 is hinged to a first hinged surface of the fuse housing 430 by a hinge 421. The hinge 421 permits an inner surface of a base portion 423 of the wire housing 420 to fold over and mate with a first side of a hinged surface 431 of the fuse housing 430. The electrical contact housing 440 is hinged to a second hinged surface of the fuse housing 430 by a hinge 441. The hinge 441 permits an inner surface of a base portion 443 of the contact housing to fold over and mate with a second side of the hinged surface 431. The hinges 421 and 441 also permit the wire housing 420 and the contact housing 440 to mate with one another as further discussed below. The hinges 421 and 441 are comprised of a flexible portion of the plastic fuse adaptor 400. In an alternative embodiment, the adaptor may have only a single hinge between either the wire housing 420, or contact housing 440, and the fuse housing 430. In yet another embodiment, the fuse housing 430 may be split and hinged at one end, wherein the wire housing 420 and the contact housing 440 each form a unitary part of the halves of the split fuse housing. The wire housing 420 has a channel 422 for receiving the wire 410, and may include opposing arcuate arms 424 extending partially over the channel 422 at opposing ends of the wire housing 420. The wire 410 is snap-fit between the opposing arcuate arms 424, which are semi-flexible, to conveniently secure the wire housing 420 along the wire 410 while the hinged adaptor 400 is being applied to the wire 410. The fuse adaptor 400, however, is secured to the wire 400 in the absence of the arms 424 when the electrical contact housing 440 is mated and engaged with the wire housing 420 as discussed below. An outer side of the wire housing 420 includes one or more wedge shaped plastic snaps 426 each having an engagement surface 428 for engaging a receiving portion of the contact housing 440. A wire severing wedge 450 is disposed in the channel 422 of the wire housing 420, and includes a sharp wire severing edge 452 arranged transverse to the wire 410 disposed along the channel 422. In one embodiment the wedge 450 is formed of a metal, which is snap-fit into the slot of an insulating plastic receptacle 429 disposed in the channel 420. In another embodiment, the wedge 450 is formed of an electrically insulating material suitable for severing a wire, for example a plastic, or a ceramic material, and is merely snap-fit, or wedged, in the channel 422 of the wire housing 420.

The electrical contact housing 440 includes a pair of wire positioning members 442 which define a wedge receiving cavity 445 for receiving at least a portion of the wedge 450 when the electrical contact housing 440 is mated with the wire housing 420 as discussed below. An outer side of the contact housing 440 includes one or more snap receptacles 444, corresponding with the wedge shaped snaps 426 of the wire housing 420, for receiving the snaps 426 as further discussed below. Each receptacle 444 includes a snap engagement surface 445 for lockably engaging the engagement surface 428 of the corresponding flexible snap 426. A conducting electrical contact 460, in one embodiment formed of a non-corrosive metal, is disposed at opposing ends of the contact housing 440, and is wedged, or snap-fit, in a receiving groove 448 disposed in the contact housing 440. The receiving groove 448 retains the electrical contacts 460 in the contact housing 440 transverse to the wire receiving channel 422 in the wire housing 420. The electrical contacts 460 each include a wedge shaped wire engagement recess 462 forming a pair of substantially parallel prongs, and a wedge shaped spade type fuse contact recess 464 also forming a pair of substantially parallel prongs. The fuse contact recess 464 is arranged substantially transverse to the wire engagement recess 462. The fuse sockets 432 for receiving spade type fuse contacts correspond in alignment with the fuse contact recesses 464 of the electrical contacts 460.

Figure 6C:
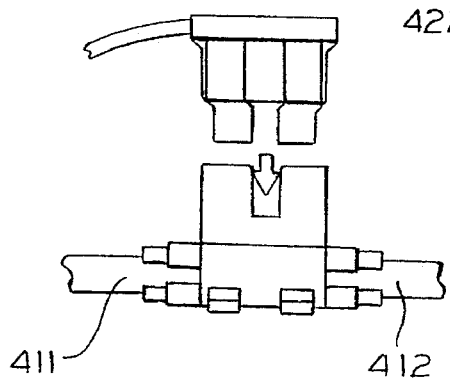
FIG. 6c is a partial side view of the hinged fuse adaptor of FIG. 6a crimped about a spliced wire.
Figure 6D:
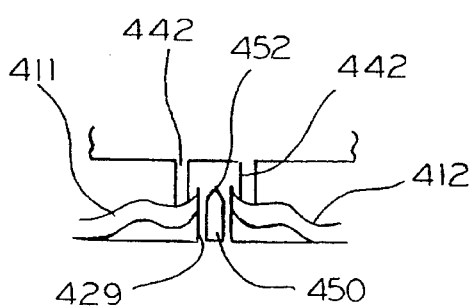
FIG. 6d is a sectional view of the hinged fuse adaptor of FIG. 6c.

In operation, FIG. 6a shows the wire 410 arranged in the wire receiving channel 422 of the wire housing 420, and retained therein by the arcuate arms 424 as discussed above. The wire 410 is disposed over wire severing wedge 450 so that the edge, or blade, 452 is transverse to the wire 410. To splice the wire 410, the wire housing and the contact housing 440 are folded along the hinges 421 and 441 so that the wire housing 420 mates with the contact housing 440 as discussed above. FIG. 6d shows the wire positioning members 442, arranged on opposing side of the insulated wedge receptacle 429, drive the wire 410 down on, or across, the blade 452 of the wedge 450 which severs the wire into two separate portions 411 and 412. The wire positioning members 442 position the wire 410 in the channel 422 of the wire housing 420, and locate the open ends of the severed wire adjacent the insulated wedge receptacle 429, which electrically insulates and isolates any exposed conducting portions of the severed wire from one another. A wedge formed of an insulating material will ensure that the severed wire portions 411 and 412 are electrically insulated in the absence of the insulated receptacle 429 required to insulate a metal wedge 450. The severed wire portions 411 and 412 are driven into wedge shaped wire engagement recesses 462 between the prongs of electrical contact 460, wherein the prongs of the recess 462 cut through any insulation on the wire and frictionally engage and retain a conductor portion of the wire portion so that the conductor of the wire portion is electrically coupled to the electrical contact 460 as is known in the art. The flexible wedge shaped snaps 426 of the wire housing 420 are received by a respective wedge receptacle 444 of the wire housing 440, wherein the snap engagement surface 428 of the snap 426 is engaged by the engagement surface 447 of the contact housing 440 to securely retain the wire housing 420 in mating relationship with the contact housing 440. The hinged fuse adaptor 400 may be applied to a wire by mere hand pressure, and its application does not require any tools. FIG. 6c shows the fuse adaptor 400 applied to a wire, wherein spade type contacts are inserted in the fuse sockets 432 of the fuse housing 430. The spade type contacts are disposed between the prongs of the wedge shaped wire engagement recesses 464 of the respective electrical contacts 460, which frictionally engage and retain the contact, and electrically couple the contacts to the respective wire portions 411 and 412. In the present invention, of course, contacts of the fuse 41 or the dummy fuse 45 are plugged into the adaptor 400 thereby conveniently coupling an interruptable circuit or a 12 volt power supply of the motor vehicle to the base circuit 100 as discussed above without the use of any tools or expertise.

FIGS. 7a and 7b are perspective views of a spade type contact adaptor 500 for coupling a spade type contacts of a fuse, or dummy spade type fuse, 502, to a glass tube or ceramic type fuse socket. In the present invention, the adaptor 500 couples the base circuit 100 to an interruptable circuit or 12 volt power supply of a motor vehicle, wherein the motor vehicle fuse panel has ceramic or glass type fuses. The fuse adaptor 500 comprises an adaptor body 510 formed of an insulating material, for example a plastic or ceramic material, for receiving a pair of electrical contacts 520. The fuse adaptor body 510 includes a fuse socket portion 530 with an insulating partition 512 that separates and electrically insulates the two contacts 520, and a pair of flexible electrical contact snaps, or retaining members, 540 disposed on opposing ends of a base portion 550. The electrical contacts 520 are formed of a non-corrosive conducting material, and each includes a tongue portion 522 having a rounded or bevelled surface 523, and a fuse connector portion 524 having a wedge shaped fuse engagement recess 525 forming a pair of substantially parallel prongs for receiving and engaging a spade contact of a spade type fuse. The socket portion 530 includes one or more grooves 532 each for receiving a prong of the fuse connector portion 524, wherein the fuse connector portion 524 of the contact 520 is slidably disposed in the socket portion 530. The electrical contact snaps 540 each comprise a wedge shaped opening 542 with an engagement surface 544 for engaging and retaining the tongue 522 of the contact 520. The opposing semi-flexible snaps 540 expand and separate in response to a force applied by the tongue portion 522 of the contact 520 as the fuse connector portion 524 is slidably disposed in the grooves 532 of the socket portion 530. The tongue portion 522 is ultimately engaged and retained by the engagement surface 544 of the snap 540, wherein the electrical contacts 520 are securely connected to the body 510 and are electrically insulated from one another. The spade type contact adaptor 500 has a length, from one end 523 to an opposing end 523, that is substantially equivalent to the length of a standard glass or ceramic type fuse so that the adaptor 500 may be disposed in a glass or ceramic fuse socket. In the present invention, the spade type contact adaptor 500 replaces a glass robe or ceramic type fuse removed from the fuse panel of a motor vehicle, and the spade type contacts of the fuse 41 or dummy fuse 45 of the security module 10 are then plugged into the adaptor 500 to electrically couple a 12 volt circuit or an interruptable circuit of the motor vehicle to the base circuit 100 as discussed above. More generally, however, spade type contacts of a standard fuse may be plugged into the adaptor 500, which is plugged into a glass or ceramic fuse socket of a fuse panel, wherein the standard spade type fuse replaces the glass or ceramic type fuse originally plugged into the glass or ceramic type fuse socket.

FIGS. 8a and 8b are perspective views of a glass or ceramic type fuse adaptor 600 for coupling a glass or ceramic type fuse 602 to a spade type fuse socket. The ceramic fuse adaptor 600 comprises an adaptor body 610 formed of an insulating material, for example a molded plastic or a ceramic, for receiving a pair of electrical contacts 620. The electrical contacts 620 each include a conducting fuse contact 622 with a protruding member 624, and a spade shaped contact 626 electrically connected to the fuse contact 622 by an intermediate portion 628. In one embodiment, the contacts 620 are formed of a stamped metal, or other electrically conducting material. The fuse adaptor body 610 includes a fuse socket portion 630 for receiving the two electrical contacts 620, and a glass or ceramic type fuse 602. The socket portion 630 of the adaptor body 610 includes slots, or grooves, 632 at opposing end portions thereof for receiving a fuse contact 622 of a respective electrical conductor 620. The adaptor body 610 also includes wedge shaped snaps 634 for engaging the intermediate portion 628 of the electrical contact 620, and retaining the contact 620 in the socket portion 630 of the adaptor body 610. The spades 626 of the electrical contacts 620 extend through corresponding recesses 636 extending through the socket portion 630. In the present invention, the glass or ceramic type fuse adaptor 600 is plugged into a spade type fuse socket on the base circuit 100, and glass or ceramic type fuse removed from the socket of the fuse panel of the motor vehicle is then plugged into the fuse adaptor 600 to protect the 12 volt supply circuit or interruptable circuit which is coupled to the base circuit 100 as discussed above. Generally, however, a glass or ceramic type fuse is plugged into the fuse adaptor 600 which is plugged into a spade type fuse socket of a fuse panel, wherein the glass or ceramic type fuse replaces the spade type fuse originally plugged into the fuse panel.

The foregoing is a description enabling one of ordinary skill in the art to make and use the preferred embodiments of the present invention. It will be appreciated by those skilled in the art that there exist variations, modifications and equivalents to the embodiments disclosed herein. The present invention therefore is to be limited only by the scope of the appended claims.

What is claimed is:

1. A security system for disabling a motor vehicle by disabling an interruptable circuit vital to the operation of the motor vehicle, the system comprising:

a base circuit having an rely for automatically disabling the interruptable circuit when an ignition of the motor vehicle is turned off, thereby disabling the motor vehicle;

a pair of electrical conductors for connecting the interruptable circuit to the base circuit;

an electrical power conductor coupling a power circuit of the motor vehicle to the base circuit;

means for enabling the disabled interruptable circuit and thereby enabling the disabled motor vehicle; and a dummy fuse having electrically isolated fuse contacts, each electrical conductor of the pair of electrical conductors being connected to one of the fuse contacts of the dummy fuse, wherein the dummy fuse is insertable into a fuse socket of the motor vehicle to connect the interruptable circuit of the motor vehicle to the base circuit.

2. The security system of claim 1, further comprising a power fuse having fuse contacts one of which is coupled to the electrical power conductor of the base circuit, wherein the power fuse is insertable into a fuse socket coupled to the power circuit of the motor vehicle to connect the base circuit to the power circuit.

3. The security system of claim 2, wherein the dummy fuse and the power fuse each have two spade type contacts, and wherein the power circuit of the motor vehicle provides power at 12 volts to the base circuit.

4. The security system of claim 3, further comprising a spade type contact adaptor for splicing a wire of the motor vehicle into two portions, and for coupling spade type contacts to respective portions of the spliced wire.

5. The security system of claim 4, wherein the spade type contact adaptor further comprises:

a wire housing having a channel for receiving the wire of the motor vehicle, and a wedge with a wire severing blade disposed in the channel of the wire housing, wherein the wire is disposed in the channel over the blade of the wedge;

a fuse housing having a pair of spade type contact receiving recesses for receiving two spade type contacts, the fuse housing connected to the wire housing;

a contact housing having a pair of wire positioning members, and an electrical contact disposed at opposing ends of the contact housing in alignment with a respective recess of the fuse housing, each electrical contact having a spade type contact receiving wedge and a wire receiving wedge, the contact housing being connected to the fuse housing:

a hinge coupling the wire housing and the contact housing, the wire housing being matable with the contact housing, wherein the wire positioning members of the contact housing drive the wire in the channel against the blade of the wedge which severs the wire into two portions, which portions are each received and engaged by the wire receiving wedge of a respective electrical contact, the spade type contacts disposable in the recesses of the fuse housing and receivable and engagable by the spade type contact receiving wedge of a respective electrical contact, wherein the severed wire portions are coupled to respective spade type contacts.

6. The security system of claim 5, further comprising a first hinge between the wire housing and the fuse housing, and a second hinge between the contact housing and the fuse housing, wherein the wire housing is foldable along the first hinge and the contact housing is foldable along the second hinge.

7. The security system of claim 6, further comprising a snap disposed on the wire housing, and a snap receiving recess disposed on the contact housing, wherein, upon folding the contact housing and wire housing along the hinge and severing the wire, the snap of the wire housing is received by the snap receiving recess of the contact housing to retain the wire housing in mating relationship with the contact housing.

8. The security system of claim 5, further comprising a spade type contact adaptor for coupling spade type contacts to a glass or ceramic type fuse socket of a motor vehicle.

9. The security system of claim 8, wherein the spade type contact adaptor further comprises:

an adaptor body having fuse socket portion disposed on a base portion, and electrical contact retaining members disposed on opposing sides of the fuse socket portion: and a pair of electrical contacts having a tongue portion, and a spade type contact receiving wedge portion for receiving and engaging a spade type contact, the tongue portion of each electrical contact retained by a respective electrical contact retaining member, and the spade type contact receiving wedge portion disposed in the fuse socket portion of the adaptor body.

10. The security system of claim 5, wherein the base circuit further comprises a spade type fuse socket.

11. The security system of claim 10, further comprising a glass or ceramic type fuse adaptor for coupling a glass or ceramic type fuse to the spade type fuse socket of the base circuit, the glass or ceramic type fuse adaptor comprising:

an adaptor body having a cavity for receiving the glass or ceramic type fuse, and a pair of contact recesses extending through the body; and a pair of electrical contacts each having a fuse contact with a protruding member, a spade shaped contact, and an intermediate portion connecting the fuse contact and the spade shaped contact, wherein the electrical contacts are disposed in the cavity of the adaptor body so that the fuse contact of the electrical contacts are at opposing ends of the cavity, and the spade shaped contacts extend through respective contact recesses of the adaptor body, wherein the spade shaped contacts are disposable in the spade type fuse socket of the base circuit.

12. The security system of claim 3, further comprising a logic circuit coupled to the interruptable circuit and coupled to the relay, wherein the logic circuit detects when the motor vehicle ignition is off, wherein, upon detecting that the ignition is off, the logic circuit sends a disable signal to the relay to disable the interruptable circuit.

13. The security system of claim 12, further comprising a timer circuit coupled to the interruptable circuit and coupled to the logic circuit, wherein the timer delays the disable signal to the relay for a predetermined time period after the ignition is turned off, thereby delaying the disabling the interruptable circuit.

14. The security system of claim 12, wherein the means for enabling the disabled interruptable circuit is a remote transmitter that transmits an RF signal, and wherein the base circuit further comprises, a receiver circuit for receiving the RF signal transmitted by the remote transmitter, a decoder circuit coupled to the receiver circuit for decoding the received RF signal, wherein, upon receipt of the RF signal, the decoder circuit sends an enable signal to the logic circuit to enable the disabled interruptable circuit.

15. The security system of claim 14, further comprising a speaker and vibration sensing circuit electrically coupled to the base circuit, wherein the base circuit provides power to the speaker and vibration sensing circuit when the interruptable circuit is disabled, the speaker and vibration sensing circuit comprising a vibration detecting circuit for detecting vibration of the motor vehicle, and an alarm circuit for emitting an alarm in response to vibration detected by the vibration detecting circuit.

16. The security system of claim 15, wherein the base circuit further comprises a switch for manually enabling the disabled interruptable circuit, and for disabling the power to the speaker and vibration sensing circuit.

17. The security system of claim 14, further comprising a filter circuit connected to the receiver circuit, wherein the filter circuit filters unwanted RF signals and selects a desired RF signal, and an amplifier circuit coupled to the filter circuit and the decoder circuit for amplifying the selected RF signal before the RF signal is decoded by the decoder circuit.

18. The security system of claim 15, further comprising a security module for receiving the base circuit, the security module having an interface with electrical contacts coupled to the base circuit, and a speaker and motion detection module for receiving the speaker and motion detection circuit, the speaker and motion detection module having an interface with electrical contacts coupled to the speaker and motion detection circuit, wherein the interface of the security module is mechanically engagable with the interface of the speaker and motion detection module, the electrical contacts of the security system module being electrically connectable to the electrical contacts of the speaker and motion detection module.

19. A security system for disabling a motor vehicle by disabling an interruptable circuit vital to the operation of the motor vehicle, the system comprising:

a base circuit having an relay for automatically disabling the interruptable circuit when an ignition of the motor vehicle is turned off, thereby disabling the motor vehicle, a logic circuit coupled to the interruptable circuit and coupled to the relay, wherein the logic circuit detects when the motor vehicle ignition is off, and, upon detecting that the ignition is off, the logic circuit sends a disable signal to the relay to disable the interruptable circuit, a timer circuit coupled to the interruptable circuit and coupled to the logic circuit, wherein the timer delays the disable signal to the relay for a predetermined time period after the ignition is turned off, thereby delaying the disabling of the interruptable circuit;

a pair of electrical conductors for connecting the interruptable circuit to the base circuit;

a dummy fuse having electrically isolated fuse contacts, each electrical conductor of the pair of electrical conductors being connected to one of the fuse contacts of the dummy fuse, wherein the dummy fuse is insertable into a fuse socket of the motor vehicle to connect the interruptable circuit of the motor vehicle to the base circuit;

an electrical power conductor coupling a power circuit of the motor vehicle to the base circuit; and means for enabling the disabled interruptable circuit and thereby enabling the disabled motor vehicle.

20. The security system of claim 19, wherein the means for enabling the disabled interruptable circuit is a remote transmitter that transmits an RF signal, and wherein the base circuit further comprises, a receiver circuit for receiving the RF signal transmitted by the remote transmitter, a decoder circuit coupled to the receiver circuit for decoding the received RF signal, wherein, upon receipt of the RF signal, the decoder circuit sends an enable signal to the logic circuit to enable the disabled interruptable circuit.

21. The security system of claim 19, further comprising a speaker and vibration sensing circuit electrically coupled to the base circuit, wherein the base circuit provides power to the speaker and vibration sensing circuit when the interruptable circuit is disabled, the speaker and vibration sensing circuit comprising a vibration detecting circuit for detecting vibration of the motor vehicle, and a siren circuit for sounding an alarm in response to vibration detected by the vibration detecting circuit.

22. The security system of claim 21, further comprising a filter circuit connected to the receiver circuit, wherein the filter circuit filters at least one of an unwanted RF signals and selects a desired RF signal, and an amplifier circuit coupled to the filter circuit and the decoder circuit for amplifying the selected RF signal before the RF signal is decoded by the decoder circuit.

23. A spade type fuse adaptor for splicing a wire and providing a fuse socket for receiving contacts of a spade type fuse along the spliced wire, the adaptor comprising:

a wire housing having a channel for receiving a wire, and a wire severing wedge with a blade disposed in the channel of the wire housing, wherein the wire is disposed in the channel over the blade of the wedge;

a fuse housing having a pair of fuse contact receiving recesses, the fuse housing connected to the wire housing;

a contact housing having a pair of wire positioning members, and an electrical contact disposed at opposing ends of the contact housing in alignment with a respective recess of the fuse housing, each electrical contact having a fuse contact receiving wedge and a wire receiving wedge, the contact housing connected to the fuse housing;

a hinge coupling the wire housing and the contact housing, the wire housing and the contact housing being foldable along the hinge to mate the contact housing with the wire housing, wherein the wire positioning members of the contact housing drive the wire in the channel against the blade of the wedge which severs the wire into two portions, which portions are each received by a wire receiving wedge of a respective electrical contact, and wherein the fuse contacts are disposable in the recesses of the fuse housing, and are receivable in a respective fuse contact receiving wedge of the electrical contact wherein the portions of the wire are coupled with respective contacts of the fuse.

24. The adaptor of claim 23, further comprising a first hinge between the wire housing and the fuse housing, and a second hinge between the contact housing and the fuse housing, wherein the wire housing is foldable along the first hinge and the contact housing is foldable along the second hinge.

25. The adaptor of claim 24, further comprising a snap disposed on the wire housing, and a snap receiving recess disposed on the contact housing, wherein the snap of the wire housing is received by the snap receiving recess of the contact housing to retain the wire housing and contact housing in mating relationship upon folding the contact housing and wire housing along the hinge.

* * * * *